3,741,940
PROCESS FOR THE PREPARATION AND RECOVERY OF ESTERIFIED COPOLYMERS CONTAINING MALEIC ANHYDRIDE

William J. Heilman, Allison Park, Pa., assignor to Gulf Research & Development Company, Pittsburgh, Pa.
No Drawing. Filed May 20, 1971, Ser. No. 145,552
Int. Cl. C08f 27/14
U.S. Cl. 260—78.5 T 9 Claims

ABSTRACT OF THE DISCLOSURE

This invention relates to a method of recovering the partially esterified product of certain polyanhydrides, such as 1-hexene-maleic anhydride copolymers, from solution with the ester content substantially unchanged by maintaining the temperature during the recovery at all times below about 80° C. In the case of the methyl esterified copolymers containing at least some diester groups, hydrolysis to convert a portion of the ester groups to acid groups occurs readily at ambient temperature upon contact of the copolymers with water.

---

This invention relates to a method of recovering the partially esterified product of certain polyanhydrides from solution without affecting the content of the half-ester groupings. This invention also relates to a method for preparing certain substantially pure half-ester compounds and more particularly to the preparation of half-esters from certain organic copolymers containing at least one cyclic acid anhydride group.

The partial or total esterification of anhydride compounds with alcohols is well known in the art. Usually the ester reaction is performed at the reflux temperature of the alcohol which can be from about 60° C. to 240° C. The esters are then separated, washed and dried at temperatures generally exceeding 100° C. However, it has been found extremely difficult to obtain a substantially pure dry half-ester free of cyclic anhydride groups by the esterification of certain organic copolymers such as maleic anhydride-1-hexene copolymers. It was believed initially that for some unknown reason the esterification was not going to completion, since the product always contained some cyclic anhydride content after drying. The substantially pure dry half-esters free of cyclic anhydride content are desired for use in certain applications such as the preparation of floor waxes. It was then discovered that the reaction to produce the desired half-esters was indeed complete and that the cyclic anhydride groups were forming during the recovery procedure. A procedure has now been developed for the recovery of the partially esterified products where the half-ester groups are not destroyed during recovery.

In some instance it may be desirable to prepare an anhydride free partially esterified copolymer which is not recovered, as such, from the alcoholic solution in which it is made but is further reacted in some desired manner. In these instances, it is important that at least the final portion, i.e. at least 20 to 60 minutes, of the esterification reaction be run at temperature from about 30° C. to 80° C., preferably 30° C. to 60° C.

In accordance with the invention, a partially esterified organic copolymer is recovered from solution with the ester content substantially unchanged by maintaining the temperature during the recovery of said partially esterified copolymer at all times below about 80° C. The organic copolymer contains at least seven carbon atoms and at least one cyclic anhydride group where the carbonyl groups of the cyclic anhydride group are directly connected to adjacent internal aliphatic carbon atoms and where one of the carbon atoms directly connected to said aliphatic carbon atoms contains an aliphatic hydrocarbon substituent which is not a part of the polymeric chain and where in said copolymer each of the mers is present in a 1:1 molar relation.

The process of this invention is applicable to the conversion of any organic copolymer containing at least seven carbon atoms and at least one cyclic anhydride group where the carbonyl groups

of the cyclic anhydride group are directly connected to adjacent internal aliphatic carbon atoms and where one of the carbon atoms adjacent said aliphatic carbon atoms contains an aliphatic hydrocarbon substituent which is not a part of the polymeric chain and where in said copolymer each of the mers is present in a 1:1 relation. The organic copolymer therefore always has at least four carbon atoms in a straight chain and the carbonyl groups of the anhydride must be directly attached to adjacent internal aliphatic carbon atoms. In addition, one of the carbon atoms adjacent a carbon atom containing the carbonyl function of the anhydride group must contain an aliphatic hydrocarbon substituent which is not a part of the polymer chain. Finally, the mers in the copolymer must be present in a 1:1 molar relation. By "internal carbon atoms" is meant carbon atoms which do not terminate the carbon chain in the organic copolymer. The process of this invention is not applicable to aliphatic cyclic anhydrides where the carbonyl groups are on the terminal carbon atoms, such as succinic anhydride; to cyclic anhydrides where the carbonyl groups are directly attached to an aromatic ring, such as phthalic anhydride; to aliphatic cyclic anhydrides where the carbon atoms adjacent to the cyclic anhydride groups contain only hydrogen substituents, such as ethylene-maleic anhydride copolymers; to styrene-maleic anhydride copolymers; or to copolymers where the mers are present in other than a 1:1 relation.

The preferred charge stocks are organic compounds containing at least one divalent radical having the formula:

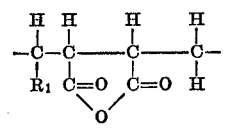

where $R_1$ is an aliphatic hydrocarbon radical having from one to 48 carbon atoms, preferably from 4 to 18 carbon atoms. By the term "aliphatic hydrocarbon radical" in this specification is meant any group of atoms consisting of carbon and hydrogen arranged in a straight or branched chain structure. The term "aliphatic hydrocarbon radical" is also intended to substantially exclude olefinic unsaturation in the radicals unless otherwise indicated.

The preferred charge stocks are those prepared by the copolymerization of maleic anhydride and an alpha-olefin having from 3 to 50, preferably 6 to 20, carbon atoms per molecule.

The maleic anhydride-alpha-olefin copolymers have the formula:

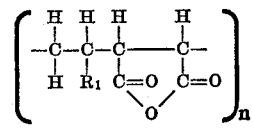

where $R_1$ is as defined and $n$ is an integer from 2 to 100.

The more preferred charge stocks are those having the formula:

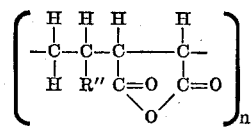

where R″ is an aliphatic hydrocarbon radical having from 4 to 18 carbon atoms and $n$ is an integer from 2 to 100, usually from 10 to 50.

The cyclic anhydride containing charge stocks for use in the process of this invention can be prepared in any suitable manner, and their method of preparation or source is not critical. Thus, organic copolymers containing the defined cyclic anhydride groups can be purchased and converted to the desired half-ester containing products by reaction with an alcohol to be defined below under conditions to be defined below.

The process of the present invention is particularly applicable, however, to the preparation and recovery of half-esters of copolymers of olefinically unsaturated compounds, such as alpha-olefins having at least three carbon atoms with maleic anhydride, which copolymers contain a plurality of internal cyclic anhydride groups. These copolymers are generally prepared by methods well known in the art. It is most convenient to perform the polymerization reaction in the presence of a liquid organic diluent which is at least a solvent for the monomers involved in the reaction.

One of the monomers is maleic anhydride, i.e.

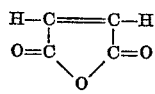

It is preferred that the maleic anhydride be substantially free of maleic acid. The maleic anhydride will, of course, react with water to form the undesired maleic acid. Commercial maleic anhydride is suitable for use in the process of this invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene, which is a solvent for the maleic anhydride but a non-solvent for the maleic acid. The acid can then be separated by filtration or otherwise and the maleic anhydride recovered by evaporation of the benzene.

The maleic anhydride monomer can be copolymerized with an olefinic compound as represented by the general formula:

where $R_1$ is as defined above, i.e. an aliphatic hydrocarbon radical having from one to 48, preferably from 4 to 18, carbon atoms. The olefinic compound suitably has from 3 to 50 carbon atoms per molecule, preferably from 6 to 20, and more preferably from 6 to 10 carbon atoms per molecule.

The preferred olefinic compounds for use in forming the solid polyanhydride are the aliphatic alpha-monoolefins, and in particular, the straight-chain alpha-monoolefins having from 6 to 20 carbon atoms per molecule.

It is understood that the term "olefin" is meant to include mixtures of monoolefins having from 3 to 50 carbon atoms per molecule, such as those obtained by the thermal or catalytic cracking of petroleum stocks. It is desirable that only one olefinic bond per molecule be present in the olefin. Minor amounts of diolefins, on the order of two percent or less, can, however, be tolerated in the olefin.

Examples of olefin compounds or mixtures of olefins suitable as co-monomers include: 1-pentene; 2-methyl-1-butene; propylene; 1-hexene; 1-butene; 4-methyl-1-pentene; 1-dodecene; 1-heptene; 1-tridecene; 1-tetradecene; 3,3-dimethyl-1-pentene; tetraisobutylene; 1-octene; 1-octadecene; 2-methyl-1-heptene; 1-eicosene; 3,3-dimethyl-1-hexene; 2-methyl-1-nonadecene; 1-nonene; 1-docosene; 4-nonene; 1-heptacosene; 4,4-dimethyl-1-heptene; 1-hentriacontene; 1-decene; 2-methylpentene-1; 1-undecene; and 2-methylbutene-1.

The copolymerization reaction can be conducted in any suitable manner. One suitable copolymer procedure involves contacting the olefinic compound with the maleic anhydride in a suitable solvent in the presence of a free-radical producing catalyst such as a peroxide. The molar ratio of the olefinic compound to the maleic anhydride can vary over a wide range, but is generally between about 1:1 and 5:1, with preferred ranges between 1:1 and 3:1. The molar ratio of the olefin mer to the maleic anhydride mer in the final product copolymer is about 1:1 using the ratios of the olefinic compound to the maleic anhydride in the copolymerization reaction medium defined above. Molar ratios of olefin to maleic anhydride in excess of 1:1 are employed in the copolymerization reaction medium to insure that all of the maleic anhydride is reacted.

The polymerization reaction is a solution-type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, preferably hydrocarbon, aroyl, and acyl radicals, carrying, if desired, substituents such as halogens, etc. The most preferred peroxides are the diaroyl and diacyl peroxides.

Examples of suitable peroxides, which in no way are limiting, include benzoyl peroxide; lauroyl peroxide; tertiary butyl peroxide; 2,4-dichlorobenzyl peroxide; tertiary butyl hydroperoxide; cumene hydroperoxide; diacetyl peroxide; acetyl hydroperoxide; diethylperoxycarbonate; tertiary butyl perbenzoate; and the various compounds, such as the perborates.

The azo-type compounds, typified by alpha,alpha'-azo-bis-isobutyronitrile, are also well known free-radical promoting materials. These azo compounds can be defined as those having present in the molecule group —N=N—;  wherein the valences are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azomethane and the phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the olefin charge stock and the reaction conditions. The initiator must, of course, be soluble in the reaction medium. The usual concentrations of initiator are between 0.001:1 and 0.1:1 moles of initiator per mole of maleic anhydride, with preferred amounts between 0.005:1 and 0.03:1. In general, the more reactive olefins, such as the vinylidene-type, require smaller amounts of the initiator.

The polymerization temperature must be sufficiently high to break down the initiator to produce the desired free-radicals. For example, using benzoyl peroxide as the initiator, the reaction temperature can be between 75° C. and 90° C., preferably between 80° C. and 85° C. Higher and lower temperatures can be employed, a suitable broad range of temperatures being between 20° C. and 200° C., with preferred temperatures between 50° C. and 120° C.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The reaction time is usually sufficient to result in the substantially complete conversion of the maleic anhydride monomer to copolymer. The reaction time is suitably between one and 24 hours, with preferred reaction times between two and ten hours.

As noted above, the subject reaction is a solution-type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomer, so as to bring them into intimate contact in the solution polymerization reaction. It has been found that the solvent must also be one in which the resultant copolymers are soluble, but not so soluble that the copolymers cannot be precipitated out of solution by the addition of a non-solvent for the copolymers.

Suitable solvents include liquid saturated or aromatic hydrocarbons having from 6 to 20 carbon atoms; ketones having from 3 to 5 carbon atoms; and liquid saturated aliphatic dihalogenated hydrocarbons having from 1 to 5 carbon atoms per molecule, preferably from 1 to 3 carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the saturated hydrocarbons having from 6 to 10 carbon atoms and the saturated dichlorinated hydrocarbons having from 1 to 5, more preferably 1 to 3, carbon atoms.

Examples of suitable solvents include, but are not limited to:

(1) saturated hydrocarbons such as:
   hexane;
   pentane;
   heptane;
   octane; and
   isooctane (2) aromatic hydrocarbons such as:
   benzene;
   xylene; and
   toluene and (3) saturated dihalogenated hydrocarbons such as:
   dichloromethane;
   dibromomethane;
   1-bromo-2-chloro-ethane;
   1,1-dibromoethane;
   1,1-dichloroethane;
   1,2-dichloroethane;
   1,3-dibromopropane;
   1,2-dibromopropane;
   1,2-dibromo-2-methylpropane;
   1,2-dichloropropane;
   1,1-dichloropropane;
   1,3-dichloropropane;
   1-bromo-2-chloropropane;
   1,2-dichlorobutane;
   1,5-dibromopentane; and
   1,5-dichloropentane.

The molecular weight of the polyanhydride can vary over a wide range. The inherent viscosity (which is a measure of molecular weight) of five grams of the polyanhydride per deciliter of acetone at 77° F. can suitably be between about 0.05 and 1.5 deciliters per gram and is usually between 0.06 and 0.08 deciliters per gram.

Copolymers containing the cyclic anhydride groups as defined above are reacted with a non-aromatic alcohol having between one and 20, preferably from one to ten, carbon atoms. By a "non-aromatic alcohol" is meant a monohydric alcohol where the alcoholic hydroxyl group is not directly attached to an aromatic ring. The aliphatic or alicyclic alcohols are preferred. If a dihydric alcohol, such as a glycol, is employed, undesired cross-linking of the anhydride charge stock can occur. The alcohol can be saturated or unsaturated and substituted or unsubstituted. Suitable alcohols can have the formula:

ROH where R is a hydrocarbon radical having from one to 20 carbon atoms or a substituted hydrocarbon radical where the substituents are selected from the group consisting of halogens, especially chlorine; —OR′, where R′ is a hydrocarbon radical having between one and 20 carbon atoms; nitro; and

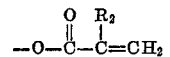

where $R_2$ is hydrogen or $CH_3$. The alcohols are preferably saturated unsubstituted monohydric alcohols containing from one to ten carbon atoms and more preferably from one to four carbon atoms.

Examples of suitable alcohols include, but are not limited to, methyl alcohol; ethyl alcohol; n-propyl alcohol; tert-butyl alcohol; allyl alcohol; n-amyl alcohol; isopentyl alcohol; cyclohexanol; capryl alcohol (octanol-2); n-octyl alcohol; n-decyl alcohol; benzyl alcohol; 2-chloroethanol; 2-fluoroethanol; 3-phenyl - 1 - propanol; 1-tetradecanol; 2-ethoxyethanol; 2-methoxyethanol; 2 - nitro-1-butanol; 3-bromo-1-propanol; 3-chloro-1-propanol; 2,3-dichloro-1-propanol; furfuryl alcohol; Cellosolve; hydroxy polyethers (such as those sold by Union Carbide under their tradename Carbowax methoxy polyethylene glycol 350, 550 and 750); 1-eicosanol; undecanol; 2-hydroxyethyl methacrylate; 2-hydroxypropylmethacrylate; 1-naphthol; 2-propyn-1-ol; cyclopentanol; linalool; geraniol; and tertiary pentyl alcohol. Mixtures of alcohols can also be employed, such as those obtained by the hydroformylation of olefins as described, for example, in U.S. Pats. 2,748,168 and 2,743,302.

The esterification reaction may occur either thermally or catalytically. The advantage of the thermal process is that it is slower and can be followed more closely by, for example, infrared analysis, to insure that a product having the desired percentage of esterification is obtained. "Percent esterification" is defined as the overall percentage of total potential carboxyl groups on the polymer chains that are in the form of the ester group, —COOR, where R is a part of the alcohol as defined above. "Potential carboxyl groups" include carboxyl groups as such and groups capable of yielding the carboxyl group, such as the cyclic anhydride group. The cyclic anhydride groups tend to react much more quickly with the alcohol to form the half-ester group than the half-ester groups to form the diester. As a result, when the percent esterification is about 50, the product is substantially a half-ester. The percent esterification can suitably be from 10 to 90 percent, is preferably from 40 to 80 percent and is most preferably from 50 to 75 percent.

The reaction temperature is suitably between 40° C. and 180° C. but should be above the melting point of the alcohols unless a solvent, such as acetone or methylethylketone, is employed. The initial reaction temperature can be an elevated temperature of between, for example, 100° C. to 120° C., but at least the final portion of the reaction should be run at a temperature below about 80° C. but above the melting point of the alcohol, since at temperatures above 80° C. the half-esters tend to reform the cyclic anhydride even in the presence of excess alcohol. Thus, if it is desirable to convert substantially all of the anhydride groups to half-ester groups with some diester groups, the final portion of the esterification reaction must be run at a temperature below about 80° C. but above the melting point of the alcohol to completely react all of the anhydride groups to at least the half-ester form. One of the basic findings of this invention is that, in order to obtain a product having at least some half-ester groups and having no cyclic anhydride groups from the reaction of the defined cyclic anhydride containing copolymers with an alcohol, the reaction temperature during at least the final portion of the esterification reaction and the temperature during the recovery of the half-ester containing product must be maintained below about 80° C. At temperatures above about 80° C., the half-ester compounds formed in accordance with this invention tend, as noted above, to form the cyclic anhydride and alcohol, especially under conditions such as drying where the alcohol is removed as it is formed. It is therefore possible that in order to obtain a faster rate of reaction initially, an increased reaction temperature above 80° C., for example, between 80° C. and 180° C., usually between 100° C. and 120° C., can be employed, so long as the final portion of the esterification reaction is run at a temperature less than about 80° C., preferably below about 60° C. but above the melting point of the alcohol if a substantially pure half-ester or a half-ester-diester product free of cyclic anhydride groups is desired, and sufficient alcohol is maintained in contact with the anhydride compound to form the desired amount of ester groups in the product.

The reaction pressure is not critical but should be such that the reactants and products are maintained in the liquid phase. Suitable reaction pressures include atmospheric to 100 p.s.i.g. or higher.

Optionally, a catalyst can be employed to promote the esterification reaction. The catalyst for this reaction can be any material having an ionization constant at 25° C. of at least about $1 \times 10^{-3}$. Suitable catalysts include liquid mineral acids having the required ionization constants, for example, sulfuric, hydrochloric, nitric and phosphoric acids; organic acids, such as benzene sulfonic and p-toluene sulfonic acids which are readily soluble in the reaction medium; and solid acidic materials including, but not limited to, ion exchange resins. The mineral acids normaly come in aqueous solution, and concentrations in aqueous solution between 25 percent and 100 percent are suitable. Concentrations of acid below about 25 percent are unsuitable when the higher carbon number (above four) alcohols are employed since the water will form a separate phase in the reactor.

Other suitable acid catalysts include hydrobromic acid; perchloric acid; trichloroacetic acid; iodic acid; and picric acid.

The amount of liquid acid catalyst to employ can vary over a wide range. Usually the weight percent of anhydrous acid based on the weight of copolymer is between 0.05 and five, with preferred anhydrous acid concentrations between 0.1 and one weight percent.

Many of the anhydride copolymers used as a charge stock are solid under normal conditions while many of the alcohols are liquid. The higher carbon number alcohols are solid under normal conditions but melt at temperatures well below 80° C. and can, if desired, be solubilized in a solvent such as acetone or methylethylketone. The anhydrides, if initially insoluble, become soluble in the liquid or melted alcohol as they react to form the half-ester. It is believed necessary for the anhydride at some stage, i.e. either initially or when they are partially esterified, to form a solution with the alcohols before substantially all of the anhydride groups will react to form the desired half-ester compounds. For example, the preferred alpha-olefin-maleic anhydride copolymers are initially insoluble in the alcohol and gradually dissolve in the alcohol as the half-ester is produced. Sufficient alcohol is normally employed to not only serve as a reactant, but to serve as a solvent for the system. The stoichiometric ratio of alcoholic hydroxyl groups in the alcohol reactant to anhydride groups in the polyanhydride reactant can be at least 0.1:1 but is usually at least 1:1. This means that it may require 10 to 100 moles of alcohol per mole of polyanhydride to obtain a stoichiometric ratio of 1:1 so as to prepare one mole of pure half-ester, i.e. where all of the anhydride groups are reacted to form at least the half-ester. As a practical matter, the volume ratio of alcohol to anhydride compound is usually between 20:1 and 100:1, which amounts to the use of the alcohol as a solvent. Enough alcohol is used to obtain a final solution with a viscosity low enough to make the solution easy to handle, i.e. to pump or stir.

If desired, stoichiometric amounts of alcohol can be employed together with a mutual solvent for the reactants. Suitable mutual solvents include benzene, acetone, methylethylketone, propylene chloride, and isooctane. However, the use of a mutual solvent involves added expense and difficulties in the separation of products.

The reaction time should be sufficient to result in the formation of the desired amount or proportion of half-ester. The usual reaction time is from 0.5 to 50 hours. The preferred reaction time will depend on whether a thermal or catalytic reaction is employed, the reaction temperature, carbon number of alcohol, the exact nature of the polyanhydride and, of course, the amount of esterification desired. The exact reaction time can be determined by following the reaction with suitable means, such as with infrared analysis until the desired amount of anhydride carbonyl absorption peaks disappear, that is, by periodically removing samples and subjecting them to analysis, such as infrared,, to determine the proportion of carbonyl groups which are still present as anhydride groups. When a substantially pure half-ester is desired, i.e. when all of the cyclic anhydride group have been converted to half-ester groups, the reaction should be stopped at that point when the anhydride carbonyl peak just disappears. This time can be shortened by the initial use of high temperatures, but the final portion of the run, usually between 20 and 60 minutes, must be run at a temperature below 80° C. but above room temperature and the melting point of the alcoholic reactant, usually between 40° C. and 60° C., if a substantially pure half-ester is desired free of cyclic anhydride groups.

The reaction can be run in a batch or continuous manner or through a coil-type reactor.

The reaction products must be recovered under conditions such that the temperatures are maintained below about 80° C., preferably between 0° and 60° C. The half-ester containing compositions can be recovered in any suitable manner. For example, the reaction products can be separated by evaporation at less than 80° C. using any suitable means such as a rotating drum dryer. Spray drying at less than 80° C. can also be used to recover the reaction products. In a preferred method, the half-esters can be precipitated as a finely divided particulate filterable solid by contacting the reaction product with a suitable non-solvent. Normally, the half-esters prepared using an alcohol having between one and four carbon atoms can be recovered as a filterable particulate white solid precipitate by contacting the reaction mixture with an excess of water at room temperature and pressure. The half-esters are further washed with water to remove the alcohol and are then dried under a vacuum (preferably a pressure between one and 50 mm. of Hg) at a temperature less than 80° C., preferably a temperature between 40° C. and 60° C. An inert dry gas such as nitrogen can be passed over the solid half-ester to aid in the drying process. By "dry" is meant substantially free, i.e. less than two weight percent of physically bound alcohol. An added advantage of utilizing the low reaction recovery temperatures of this invention is that the particulate solid half-ester is pure white in color with no undersirable color bodies present, such as woud be the case if high temperatures were employed It has been found that the thermal reaction of the alcohol with the cyclic anhydride compounds defined above is such that the half-ester initially forms followed on further contact with the alcohol by conversion of the half-ester to the diester. The reaction can be followed, for example, by continuous infrared analysis as noted above and stopped upon the disappearance of the anhydride carbonyl absorption peak from the reaction mixture, which disappearance signals the formation of half-ester. Continued contact of the half-ester with the alcohol will result in the formation of some diester even though no water is removed from the reaction zone, probably due to equilibrium conditions. If a substantially pure half-ester is the desired product (50 percent esterification), which it is in this invention, the reaction should be stopped promptly on the disappearance of the anhydride carbonyl absorption peak from the reaction mixture or by any other suitable control means, such as when the acid number of the reaction mixture by ASTM Test D–974 is reduced and approaches the acid number of the desired half-ester.

It has additionally been found that in the case of the methyl esterified copolymers containing at least some diester, at least a portion of any diester which is present can be easily and quickly converted to the half-ester and methanol by contact of the diester-half-ester with water. The methyl diester content of the cyclic anhydride compounds defined above quite unexpectedly reacts quickly with water to form the half-ester and methanol even at ambient temperatures and in the absence of a catalyst. This diester conversion to half-ester and methanol occurs readily only with the methyl diester to form a methyl half-ester and methanol. Initially it was believed the esterified cyclic anhydrides could be recovered from their solution in excess alcohol by precipitation of the esterified product in water at ambient temperatures. No reaction of the esterified product with water was expected in the absence of a catalyst at the mild ambient temperatures used for precipitation and filtration. Contrary to expectations, it was found the methyl diester thermally reacted to form the methyl half-ester and methanol.

The amount of diester reaction to form the half-ester and methanol appears to vary for reasons which are not understood. In all cases, however, the acid number of the methyl esterified copolymer increases after hydrolysis, indicating the conversion of ester groups to acid groups. This initial hydrolysis is a very fast reaction and further hydrolysis becomes extremely slow so that for practical purposes the product is considered to be water stable. That any hydrolysis would occur at all was surprising and is peculiar to the methyl esterified copolymers containing at least some diester as indicated by any suitable means such as an acid number less than the theoretical acid number for the half-ester.

In accordance with one aspect of the invention, a methyl esterified copolymer polyanhydride as defined above and containing at least a portion of methyl diester groups is hydrolyzed to a water stable form containing a greater amount of acid groups by contact with water under hydrolysis conditions.

While the methyl esterified copolymer containing some diester can be contacted with water while the copolymer is in the solid phase, it is preferred, if hydrolysis is desired, to contact the diester containing copolymer with the water while the diester is in solution in a solvent such as methanol, which solvent is, itself, miscible with water. For example, if some methyl diester is formed in the preparation of the half-ester by reaction of the cyclic anhydride compounds with methanol, the diester-half-ester product is in solution in the methanol and the solution can be poured into or otherwise contacted with water to precipitate the ester and cause the hydrolysis of at least some of the methyl ester groups to form acid groups and a water stable product. The reaction can be followed by continuous acid number analysis (such as ASTM Test D–974) to obtain a product having the desired acid number. However, when and if the acid number of the reaction mixture corresponds to the acid number of the substantially pure half-ester, the reaction is for practical purposes over. It has been found that if the esterification reaction using methanol at reflux is followed by infrared analysis until the anhydride carbonyl peaks just disappear, and the product is recovered by precipitation in water at ambient temperatures followed by filtration and drying at temperatures less than 80° C., a substantially pure dry half-ester is produced.

The hydrolysis of the methyl diester can suitably occur at a temperature between 20° C. and 100° C., ambient temperatures being sufficient and preferred for economic reasons. Pressure is not critical, and atmospheric pressure is preferred, although higher pressures on the order of 100 p.s.i.g. or higher can be employed. The amount of water must at least be that amount which is theoretically required for the conversion of the diester to the half-ester but is usually used in large excess amounts to aid in precipitating the ester product in a finely divided form for ease of recovery by filtration. The conversion of at least a portion of the methyl ester groups to acid groups and methanol is a very fast reaction even at ambient temperatures. The total reaction time will, of course, very depending on the temperature, amount of water, type of contacting and, of course, the amount of the methyl diester to be converted. Usually the reaction time is between 0.1 and 2.0 hours.

The invention will be further described with reference to the following experimental work.

EXAMPLE 1

In the run for this example, two moles of hexene-1, one mole of maleic anhydride and 0.01 mole percent benzoyl peroxide based on the maleic anhydride were admixed with a sufficient amount of ethylene dichloride (boiling point of 37° C.) to form a solution. The mixture was reacted at 37° C. and 0 p.s.i.g. for 48 hours. The resulting hexene-1-maleic anhydride copolymer was soluble in the reaction mixture.

The product solution was poured into a large excess of methanol at room temperature and the copolymer precipitated as a finely divided solid. The mixture was heated to 64° C. at atmospheric pressure in the absence of a catalyst to convert the anhydride groups to half-ester groups and to remove an azeotrope consisting of 20 weight percent methanol and 80 weight percent ethylene dichloride over a period of 24 hours. Sufficient methanol remained behind to serve as a diluent for the copolymer which was soluble in the methanol after it was converted to the half-ester form.

The solution of half-ester copolymer in methanol was then poured into an excess of water to precipitate the copolymer half-ester as a finely divided filterable white solid and infrared analysis indicated no anhydride or diacid groups were present in the product.

The product was then separated from the water and excess methanol, and dried under a vacuum of 1 mm. of Hg and a temperature of 50° C. for 24 hours. Infrared analysis again showed the presence of no anhydride or diacid groups in the product.

Example 1 shows that heating the esterified copolymer for 24 hours at 50° C. does not change anhydride or diacid content of the product. The half-ester content of the product remained unchanged by recovering the product at 50° C.

EXAMPLE 2

In the run for this example, 114.7 grams of a butene-1-maleic anhydride copolymer having an intrinsic viscosity of 0.12 was reacted with 400 grams (66.6 moles) of n-propanol at 80° C. and atmospheric pressure for 12 hours. Analysis by infrared showed the presence of small amounts of anhydride groups, that is, 11 percent by weight of the total carbonyl content was present in the form of anhydride groups.

EXAMPLE 3

The product from Example 2 was further heated for five hours at 60° C. in the presence of the n-propanol, and analysis of the product showed no anhydride groups remaining.

Example 3 shows that at 60° C., no anhydride forms and therefore the product must have the same half-ester content with which it started. That some half-ester is present is evident since no water was removed and it is notoriously known that the formation of diester is very difficult thermally even if water is removed.

EXAMPLE 4

In the run for this example, 40 grams of a hexene-1-maleic anhydride copolymer having an intrinsic viscosity of 0.06 were admixed with 90 milliliters of n-hexyl alcohol (an excess) and heated at 140°–150° C. for 24 hours. Infrared analysis showed anhydride groups were present.

The run was continued at a temperature of 80° C. for 20 hours and analysis of the product showed no anhydride groups were present.

The run was continued for four more hours and the temperature was increased to 140°–150° C. Analysis of the product showed the presence of anhydride groups in the same amounts as in the first portion of the run made at 140°–150° C.

Example 4 shows that anhydride groups are not present in the product at temperatures less than 80° C. whereas anhydride groups persist in the product at temperatures in excess of 80° C.

A comparison of Examples 1–4 shows the criticality of reaction temperature during reaction or otherwise if it is desirable to recover a product substantially free of cyclic anhydride groups. In Example 1, a reaction temperature of 64° C. for 24 hours was sufficient to result in a final product having no anhydride groups. In Example 2, a reaction temperature of 80° C. for 12 hours was not sufficient to convert all of the cyclic anhydride groups. This should be compared with Example 4, however, where a reaction temperature of 80° C. for 20 hours was sufficient to result in an anhydride free product. Thus, a temperature of 80° C. is satisfactory if a sufficient contact time is allowed. Examples 2 and 3 show that 12 hours at 80° C. and five more hours at 60° C. is also sufficient to result in an anhydride free product. Example 4 also shows that a temperature of 140°–150° C. is unsuitable since after a 24-hour reaction period, the product contains anhydride groups. In addition, Example 4 shows that an anhydride free product obtained at 80° C. will reform the anhydride if the temperature is increased to 140°–150° C. even though an excess of alcohol is present.

EXAMPLE 5

In the run for this example, 20 grams of a maleic anhydride-hexene-1 copolymer having an intrinsic viscosity of 0.134 were reacted with 32 grams of methanol at 65°–67° C. Samples were taken at 3.5 hours, 5 hours and 22.5 hours and subjected to infrared analysis to determine the extent of the formation of half-esters. The anhydride content was reduced after 3.5 and 5 hours. After 22.5 hours, no anhydride could be detected by infrared analysis.

EXAMPLE 6

Example 5 was repeated except 60 grams of n-propanol was used in place of methanol and the esterification occurred at 90°–94.5° C. Samples of product were taken after three hours, six hours and 27 hours of reaction. Infrared analysis showed the presence of anhydride groups even after 27 hours of reaction.

A comparison of Examples 4, 5 and 6 shows that a temperature of 65°–80° C. is sufficient after 22–24 hours to result in the production of an anhydride free product, but a temperature of 90°–94.5° C. (Example 6) is too high to result in the production of an anhydride free product.

EXAMPLE 7

In the run for this example, 115 grams of a copolymer of butene-1 and maleic anhydride having an intrinsic viscosity of 0.121 was mixed with 500 milliliters of n-butanol. The mixture was heated for 18 hours at 117° C. and a large amount of anhydride was detected by infrared analysis.

EXAMPLE 8

In the run for this example, 7500 cc.'s of hexene-1 and 2940 grams of maleic anhydride were reacted in 13,500 cc.'s of propylene dichloride and 1500 cc.'s of carbon tetrachloride using 145.2 grams of benzoyl peroxide as the catalyst in a 10-gallon autoclave for 12 hours at 129° C. The resulting copolymer had a dilute solution viscosity of 0.64. The grams of recovered copolymer was 4668.

The product copolymer was mixed with seven gallons of methanol and refluxed for 24 hours at 65° C. in the absence of a catalyst and without removing water to obtain the methyl half-ester. Infrared analysis showed the absence of any carbonyl groups present as anhydride groups in the product.

The product was heated for five hours at 50° C. under a vacuum of one mm. of Hg. Infrared analysis showed 1.6 mole percent anhydride groups in the product. Acid number by ASTM D–974 was 242, showing no anhydride and some diester (260 is theoretical).

The product was further heated at 80° C. for 16 hours while removing any alcohol as formed, i.e. under a vacuum of one mm. of Hg, and infrared analysis showed that about half of the carbonyl groups were now present as anhydride groups. Continued heating under vacuum at 100° C. for an additional 121 hours showed the product to be substantially pure anhydride.

Example 8 shows that a substantially pure half-ester is made at a reaction temperature of 65° C. and is maintained anhydride free when heated for five hours at 50° C. under a vaccum of one mm. of Hg. The product at this point was a free flowing white powder substantially free of physically bound alcohol, i.e. it was dry. Upon heating to 80° C. and 100° C. under a vacuum, however, anhydride formed, illustrating again the criticality of the temperature during the recovery.

EXAMPLE 9

In the run for this example, 81 grams of poly(hexene-1-maleic anhydride) and 226 ml. of methyl alcohol were reacted using 0.81 gram of sulfuric acid having an $H_2SO_4$ content of 96.0 percent as the catalyst. The weight percent anhydrous acid employed based on the copolymer was 0.96. The reaction was run at 66° C. for two hours until infrared analysis indicated the absence of carbonyl anhydride absorption peaks.

The reaction solution was cooled to room temperature and poured into an excess of water at room temperature. The esterified copolymer precipitated as a white particulate solid. The precipitated esterified copolymer was filtered at room temperature and dried under a vacuum of one mm. of Hg. at a temperature of 50° C.

The yield of dried ester was 80.8 grams which had an acid number by ASTM Test D–974 of 262 and a dilute solution viscosity of 0.83 deciliter per gram. The theoretical acid number for the hexene-1-maleic anhydride copolymer half-ester is 261.5. Nuclear magnetic resonance showed the product was free of anhydride groups.

EXAMPLE 10

Example 9 was repeated except 0.81 gram of benzene sulfonic acid was used in place of the sulfuric acid as the catalyst. The weight percent benzene sulfonic acid employed based on the weight of copolymer was one. The reaction solution was refluxed at 65° C. for four hours at which time infrared analysis indicated an absence of carbonyl anhydride absorption peaks. The yield of dried ester was 90.2 grams which had an acid number of 256 and a dilute solution viscosity of 0.082 deciliter per gram. Nuclear magnetic resonance showed the product was free of anhydride groups.

Examples 9 and 10 show that various acid catalysts can be employed to produce substantially pure dry half-esters which are anhydride free. Examples 9 and 10 when compared with Example 1 also illustrate that methyl half-esters of the polyanhydrides of this invention can be prepared more quickly using a strong acid catalyst. It is well known in the art that the use of strong acid catalysts such as sulfuric results in the formation of some diester, but in the case of the methyl diesters, hydrolysis unexpectedly occurs very quickly to convert the diester portion to the half-ester. Thus, in the time required for the aqueous precipitation and recovery of the product from reaction solution, the diester content is converted to half-ester, particularly in the presence of small amounts of the strong acid. The result was quite unexpected and occurred only with the methyl diesters and not the higher carbon number alcohol diesters.

The examples below further illustrate the unusual phenomenon of the unique hydrolysis of the methyl diester products.

EXAMPLE 11

A hexene-1-maleic anhydride copolymer which was thermally esterified with methanol, precipitated in heptane, filtered and dried at 50° C. for 24 hours had an acid number of 219, which indicates some diester. This dried product was redissolved in methanol, precipitated in water and stirred for 15 minutes at room temperature. The solid was filtered and dried at 50° C. for 24 hours. The acid number of the product was 260, showing that the product contained less diester than before hydrolysis.

EXAMPLE 12

Example 11 was repeated except the hydrolysis lasted for 20 hours and substantially the same results were obtained.

Examples 11 and 12 show that hydrolysis of methyl diesters to a substantially water stable product occurs very quickly, for the results achieved in 15 minutes (Example 11) did not change in 20 hours of hydrolysis (Example 12). When the product from Example 12 was hydrolyzed further for seven days, a small additional amount of hydrolysis occurred as the dried product had an acid number of 277.

When Example 12 was repeated above except ethyl alcohol was used as the esterifying alcohol, substantially no hydrolysis of the ethyl diester occurred even after six days.

Results similar to those with ethyl alcohol were achieved when normal octyl alcohol was employed as the esterifying alcohol.

EXAMPLE 13

An ethanol esterified hexene-1-maleic anhydride copolymer having an acid number of 199 (a theoretical acid number of 245 for the half-ester) was dissolved in ethanol and immediately poured into boiling water. After one hour the heat was turned off and the product was cooled to room temperature and filtered. The acid number of the resulting product was substantially the same, indicating that hydrolysis of ethyl esterified copolymers does not occur even at the increased temperatures of reaction.

The substitution of the corresponding normal octyl diester containing products for the ethyl esterified copolymers in Example 13 resulted in no appreciable conversion of the normal octyl diester groups to the corresponding normal octyl half-ester groups.

EXAMPLE 14

160 grams of a hexene-1-maleic anhydride copolymer was admixed with 500 ml. of ethanol (200 proof) and 1.6 grams of p-toluene sulfonic acid and heated to reflux while stirring. Samples were taken with time, precipitated in heptane or water at room temperature, dried at 50° C. for eight hours and an acid number determined by ASTM Test D–974. The results are shown in Table I below. The theoretical acid number for pure half-ester is 245.

TABLE I

| Sample time (days) | Precipitating medium | Acid number |
|---|---|---|
| 1 | Heptane | 230 |
| 2 | do | 223 |
| 5 | do | 215 |
| 6 | do | 214 |
| 7 | do | 216 |
| 9 | do | 208 |
| 14 | Water | 200 |
| 14 | Heptane | 199 |

Example 14 shows that for ethyl diester containing copolymers, there is substantially no hydrolysis.

A series of runs were made by esterifying a hexene-1-maleic anhydride copolymer with various alcohols at 97° C. using toluene sulfonic acid as a catalyst to obtain a product having at least some diester and precipitating half the product in heptane and the other half in water at room temperature. The precipitated products were filtered and dried at 50° C. for 24 hours. Acid number analyses were then run to determine which products were hydrolyzed. The data are shown in Table II below

TABLE II

| Example number | Alcohol | Acid number Precipitated in water | Acid number Precipitated in heptane | Theoretical acid number for the half-ester |
|---|---|---|---|---|
| 15 | Methyl | 250 | 222 | 261.7 |
| 16 | Isopropyl | 224 | 224 | 231.4 |
| 17 | Isobutyl | 131 | 121 | 218.8 |
| 18 | Ethyl | 200 | 199 | 245.6 |
| 19 | n-Propyl | 161 | 165 | 231.6 |
| 20 | sec-Butyl | 216 | 210 | 218.8 |

A comparison of Examples 15–20 shows that only the methyl diester containing product is increased in acid number after precipitation in water, indicating hydrolysis of ester groups to acid groups.

EXAMPLE 21

In the run for this example, 164 grams of a hexene-1-maleic anhydride copolymer was admixed with 460 ml. of methanol and 1.64 grams of toluene sulfonic acid. The mixture was heated at reflux and samples were taken at one, two, seven and ten hour intervals. Infrared analysis indicated no anhydride carbonyl peaks remaining after one hour reaction. Each of the samples was split in two parts and one part was added to water while the other part was added to heptane. The formed precipitates were filtered and dried in a vacuum oven at 50° C. for 24 hours. The data are contained in Table III below. The theoretical half-ester acid number is 261.7.

TABLE III

| Sample number | Reaction time, hours | Acid number Precipitated in water | Acid number Precipitated in heptane |
|---|---|---|---|
| A | 1 | 285 | 249 |
| B | 2 | 267 | 238 |
| C | 7 | 248 | 233 |
| D | 10 | 250 | 219 |

EXAMPLE 22

The heptane precipitated product from Sample No. D of Example 21 was dissolved in methanol and precipitated in cold water, filtered and dried in a vacuum oven at 50° C. The acid number of the product was 255.

EXAMPLE 23

The water precipitated product from Sample No. D of Example 21 was dissolved in methanol and reprecipitated in cold water, filtered and dried in a vacuum oven at 50° C. The acid number of the product was 251, showing the product is substantially water stable.

Resort may be had to such variations and modifications as fall within the spirit of the invention and the scope of the appended claims.

I claim:

1. A process for the preparation of a substantially water stable methanol esterified organic copolymer which comprises
    contacting said methanol esterified organic copolymer containing at least a portion of methyl diester groups with water under hydrolysis conditions to convert at least a portion of the ester groups in said copolymer to acid groups and produce a substantially water stable partially esterified organic copolymer;
    said organic copolymer containing at least one cyclic anhydride group where the carbonyl groups of the cyclic anhydride group are directly connected to adjacent internal aliphatic carbon atoms and where one of the carbon atoms directly connected to said aliphatic carbon atoms contains a substituent larger than hydrogen.

2. A process for the preparation of a substantially water stable methanol esterified organic copolymer which comprises:
    copolymerizing maleic anhydride with an alpha-olefin having from 3 to 50 carbon atoms in the presence of a free radical catalyst;
    contacting said copolymer with an excess of methanol at a temperature from 40° C. to 18° C. for a time such that at least a portion of the cyclic anhydride groups are converted to half-ester groups;
    continuing to contact said copolymer with said methanol at a temperature less than about 80° C. for a time sufficient to convert substantially all of the cyclic anhydride groups to half-ester groups and to convert at least a portion of the half-ester groups to diester groups;
    contacting said half-ester-diester with an excess of water under hydrolysis conditions to precipitate the half-ester in a particulate solid form.

3. A process according to claim 2 wherein the particulate solid is recovered and dried while the temperature is maintained at less than 80° C.

4. A process according to claim 3 wherein the hydrolysis occurs thermally at a temperature from 20° C. to 100° C. and the particulate solid half-ester is recovered by filtration.

5. A process according to claim 3 wherein the alpha-olefin has from 6 to 20 carbon atoms.

6. A process according to claim 5 wherein the alpha-olefin is 1-hexene.

7. A process according to claim 2 wherein said esterification reaction occurs in the presence of a catalyst having an ionization constant at 25° C. of at least about $1 \times 10^{-3}$.

8. A process for the preparation of a substantially water stable methanol esterified organic copolymer which comprises:
    copolymerizing maleic anhydride with an alpha-olefin having from 6 to 20 carbon atoms in the presence of a free radical catalyst;
    contacting said copolymer with an excess of methanol at a temperature from 40° C. to 180° C. for a time such that at least a portion of the cyclic anhydride groups are converted to half-ester groups;
    continuing to contact said copolymer with said methanol at a temperature less than about 80° C. for a time to convert substantially all of the cyclic anhydride groups to half-ester groups and to produce a product having at least some diester and an acid number less than the theoretical acid number for the half-ester;
    contacting said half-ester-diester with an excess of water under hydrolysis conditions to precipitate a product having a higher desired acid number in a particulate solid form.

9. A process according to claim 8 wherein said esterification reaction occurs in the presence of a catalyst having an ionization constant at 25° C. of at least about $1 \times 10^{-3}$.

References Cited
UNITED STATES PATENTS 3,488,311  1/1970  Burdick et al. _____ 260—29.6

JAMES A. SEIDLECK, Primary Examiner

J. KIGHT III, Assistant Examiner